April 8, 1952  R. W. WEBER  2,592,217
TRAILER HITCH WITH A DETACHABLE COUPLING MEANS
Filed May 6, 1950
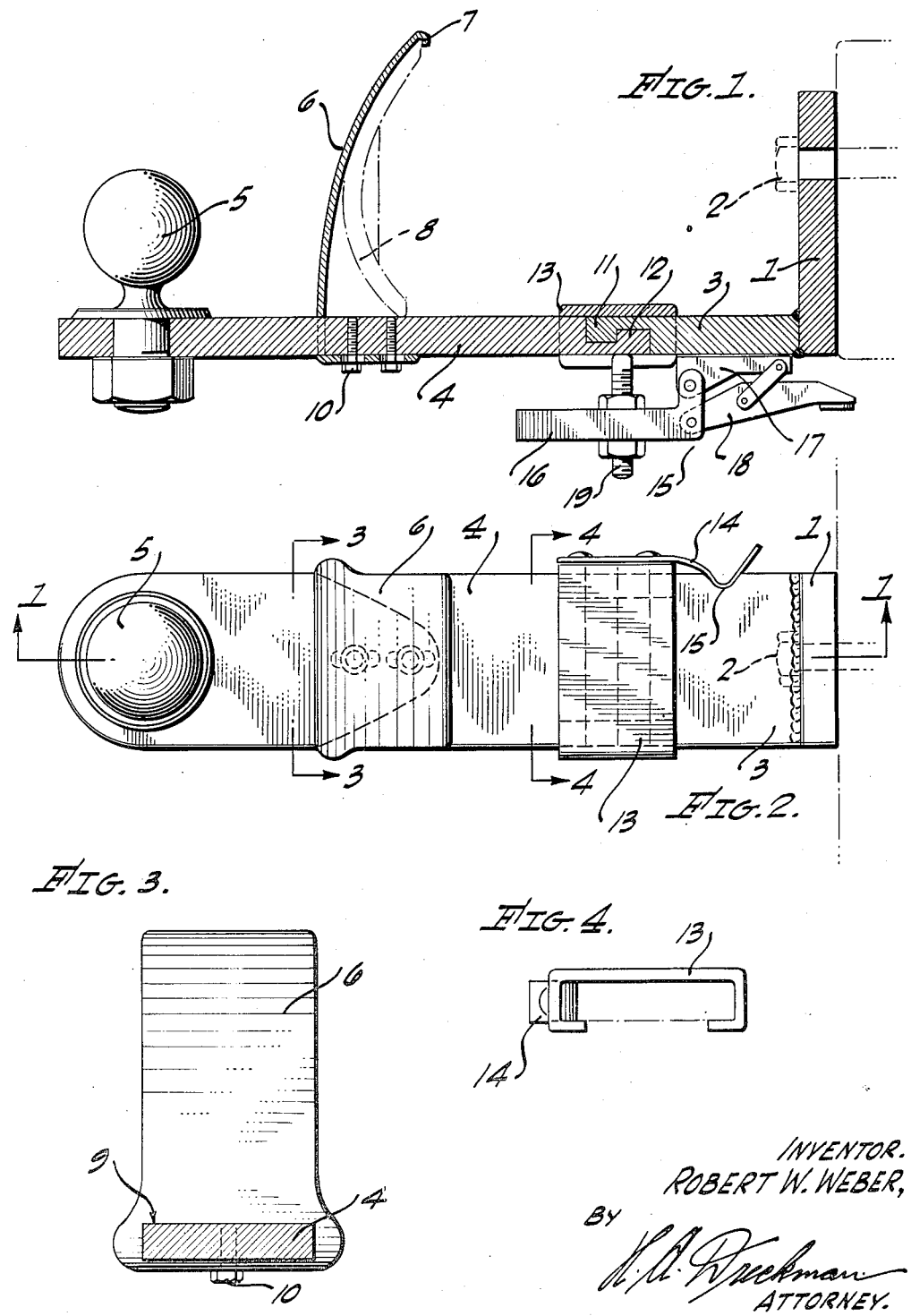
INVENTOR.
ROBERT W. WEBER,
BY
ATTORNEY.

Patented Apr. 8, 1952

2,592,217

UNITED STATES PATENT OFFICE 2,592,217

TRAILER HITCH WITH A DETACHABLE COUPLING MEANS

Robert W. Weber, Long Beach, Calif., assignor of fifty-one per cent to John B. Hitchings, Long Beach, Calif.

Application May 6, 1950, Serial No. 160,459

3 Claims. (Cl. 280—33.44)

This invention relates to a trailer hitch and particularly a hitch which can be quickly and easily detached from the vehicle so that there is no unsightly coupling apparent when the trailer is not being used.

An object of my invention is to provide a novel trailer hitch which can be easily coupled to the towing vehicle and which includes a novel means to secure the coupling in operative position.

Another object of my invention is to provide a novel trailer hitch, the detachable portion of which is partly supported from the bumper and is detachably secured to a structure fixedly secured to the frame of the towing vehicle.

Other objects, advantages and features of invention may appear from the accompanying drawing, the subjoined detailed description, and the appended claims.

In the drawing:

Figure 1 is a longitudinal sectional view taken on line 1—1 of Figure 2.

Figure 2 is a top plan view of my trailer hitch.

Figure 3 is a sectional view taken on line 3—3 of Figure 2.

Figure 4 is an end view of the coupling sleeve taken from the line 4—4 of Figure 2.

Referring more particularly to the drawing, the numeral 1 indicates a body bracket which is bolted to the chassis or body of the towing vehicle by means of the bolts 2. The body bracket includes a horizontal member 3 which is fixedly secured to the member 1, or may be an integral part thereof. The hitch plate 4 is detachably secured to the member 3 in a manner to be subsequently described. A ball 5 of usual and well known construction is mounted on the plate 4 in the usual and well known manner, and the trailer tow bar is attached to this ball in the usual and well known manner.

To partially support the plate 4, I provide a bumper bracket 6 which is provided with a hook 7 at the upper end to engage the upper edge of the bumper 8. The bracket 6 is formed with a suitable opening 9, through which the plate 4 extends, substantially as shown in Figure 3. A plurality of cap screws 10 extend through the bracket and into the plate 4, thus holding the bracket securely in position. The brackets 6 are variously shaped to accommodate different shaped rear bumpers 8, and the bracket is always so designed that the plate 4 will be held tightly against the bottom edge of the bumper 8.

The element 3 is formed with a step lock 11 and the plate 4 is formed with a complementary step lock 12, these two locks inter-engaging, as shown in Figure 1, and when the members 3 and 4 are held in this position, tension can be applied to the plate 4 so that the trailer may be towed. A sleeve 13 is slidably mounted on the plate 4 and this plate may be moved rearwardly to surround the step locks 11 and 12, as shown in Figures 1 and 2. In this position the sleeve 13 will prevent the step locks 11 and 12 from disengaging and will also hold the parts 3 and 4 in proper alignment. A spring latch 14 on the sleeve 13 engages a notch 15 in the member 3, thus holding the sleeve 13 in position to lock the members 3 and 4.

A vice 15, of usual and well known construction, includes an arm 16 which is pivotally mounted below the member 3 on the bracket 17. The bracket 17 is fixedly attached to the bottom of member 3. A toggle 18 is pivotally attached to the arm 16 for the purpose of swinging this arm on its pivot and also moves the threaded stud 19 into or out of engagement with the bottom of the plate 4, thus further locking or unlocking the step locks 11 and 12, as will be evident. A link 18' is pivotally attached at one end to the toggle 18 and at the other end to the bracket 17. As viewed in Figure 1, when the rear end of the toggle is pressed downwardly, the link 18' will swing downwardly and to the right moving on its pivot in the bracket 17. The arm 16 will thus be swung to the right on its pivot in the bracket 17 and this pivotal movement of the arm will swing the stud 19 downwardly and away from engagement with the plate 4.

Having described my invention, I claim:

1. A trailer hitch including a bracket adapted to be secured to the frame of a towing vehicle, a towing plate, a coupling ball on said towing plate, a step lock on said bracket, a complementary step lock on said towing plate, said step locks being inter-engageable, and a sleeve slidably mounted on said towing plate and movable over said step locks, a latch vice pivotally mounted on said bracket, a stud on said vice engageable with the bottom face of the towing plate and under said step locks, and an actuating arm on said stud to swing said vice into engagement with the towing plate.

2. A trailer hitch including a bracket adapted to be secured to the frame of a towing vehicle, a towing plate, a coupling ball on said towing plate, a step lock on said bracket, a complementary step lock on said towing plate, said step locks being inter-engageable, and a sleeve slidably mounted on said towing plate and movable over said step locks, a bracket mounted on said towing plate, said bracket being engageable with the rear bumper of the towing vehicle, a latch vice pivotally mounted on said bracket, a stud on said vice engageable with the bottom face of the towing plate and under said step locks, and an actuating arm on said vice to swing said stud into engagement with the towing plate.

3. A trailer hitch including a bracket adapted to be secured to the frame of a towing vehicle, a towing plate, a coupling ball on said towing plate, a step lock on said bracket, a complementary step lock on said towing plate, said step locks being inter-engageable, and a sleeve slidably mounted on said towing plate and movable over said step locks, a bracket mounted on said towing plate, a hook on the upper end of said bracket, said hook engaging the rear bumper of the towing vehicle, and a spring catch on said sleeve engaging the bracket to hold said sleeve in locking position, a latch vice pivotally mounted on said bracket, a stud on said vice engageable with the bottom face of the towing plate and under said step lock, and an actuating arm on said vice to swing said stud into engagement with the towing plate.

ROBERT W. WEBER.

REFERENCES CITED

The following references are of record in the file of this patent:

UNITED STATES PATENTS

| Number | Name | Date |
| --- | --- | --- |
| 607,325 | Barnes | July 12, 1898 |
| 826,706 | Brent | July 24, 1906 |
| 1,818,261 | Koch et al. | Aug. 11, 1931 |
| 1,982,183 | Tarbox | Nov. 27, 1934 |
| 2,097,006 | Weis | Oct. 26, 1937 |
| 2,458,209 | Sawatzki | Jan. 4, 1949 |
| 2,549,941 | Smith | Apr. 24, 1951 |